United States Patent [19]

Dugan

[11] Patent Number: 4,934,516
[45] Date of Patent: Jun. 19, 1990

[54] APPARATUS FOR SUPPORTING AN ARTICLE CONVEYING SYSTEM

[75] Inventor: Larry M. Dugan, Boulder, Colo.

[73] Assignee: Adolph Coors Company, Golden, Colo.

[21] Appl. No.: 240,742

[22] Filed: Sep. 6, 1988

[51] Int. Cl.⁵ .............................................. B65G 21/20
[52] U.S. Cl. .................................. 198/836.4; 198/841; 198/860.2; 198/861.1
[58] Field of Search ..................... 198/836, 841, 860.2, 198/861.1

[56] References Cited

U.S. PATENT DOCUMENTS

| | | | |
|---|---|---|---|
| 2,253,761 | 8/1941 | Campbell | 198/836 |
| 3,116,824 | 1/1964 | Stram | 198/836 |
| 3,739,904 | 6/1973 | Windstrup | 198/836 |
| 3,835,982 | 9/1974 | Zappia | 198/841 |
| 3,848,732 | 11/1974 | Catalano | 198/841 |

FOREIGN PATENT DOCUMENTS

| | | | |
|---|---|---|---|
| 2416775 | 10/1975 | Fed. Rep. of Germany | 198/841 |
| 3238788 | 4/1984 | Fed. Rep. of Germany | 198/841 |

OTHER PUBLICATIONS

Photographs A and B.

*Primary Examiner*—Joseph E. Valenza
*Attorney, Agent, or Firm*—Klaas & Law

[57] ABSTRACT

Apparatus for supporting at least one endless movable chain conveyor for carrying articles and having a top run and a bottom run wherein a plurality of spaced apart base support members are mounted on a fixed support surface with each of the base support members having a primary plate support member releasably secured thereto. Each primary plate support member has opposite end portions and a primary support member is releasably secured to each end portion. A rigidifying tube is releasably secured to a plurality of the primary support members to provide rigidity to the apparatus which rigidifying tube in located between the top and bottom runs. Top run chain guides and supports extend between and are releasably secured to adjacent primary support members and bottom run chain guides and supports are releasably secured to the primary plate support members. The apparatus is substantially completely open so that all portions thereof are readily available for inspection and/or cleaning.

18 Claims, 10 Drawing Sheets

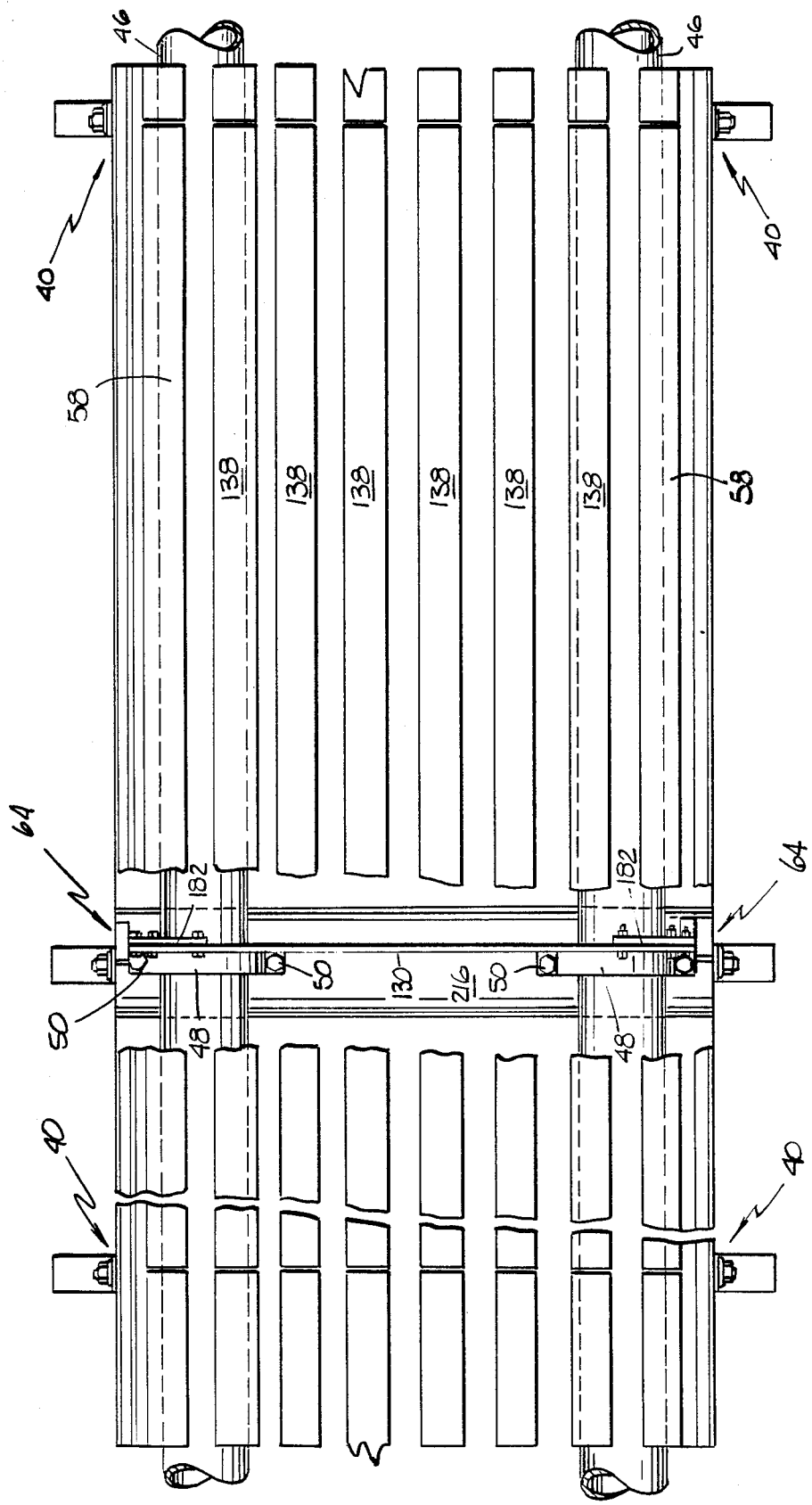

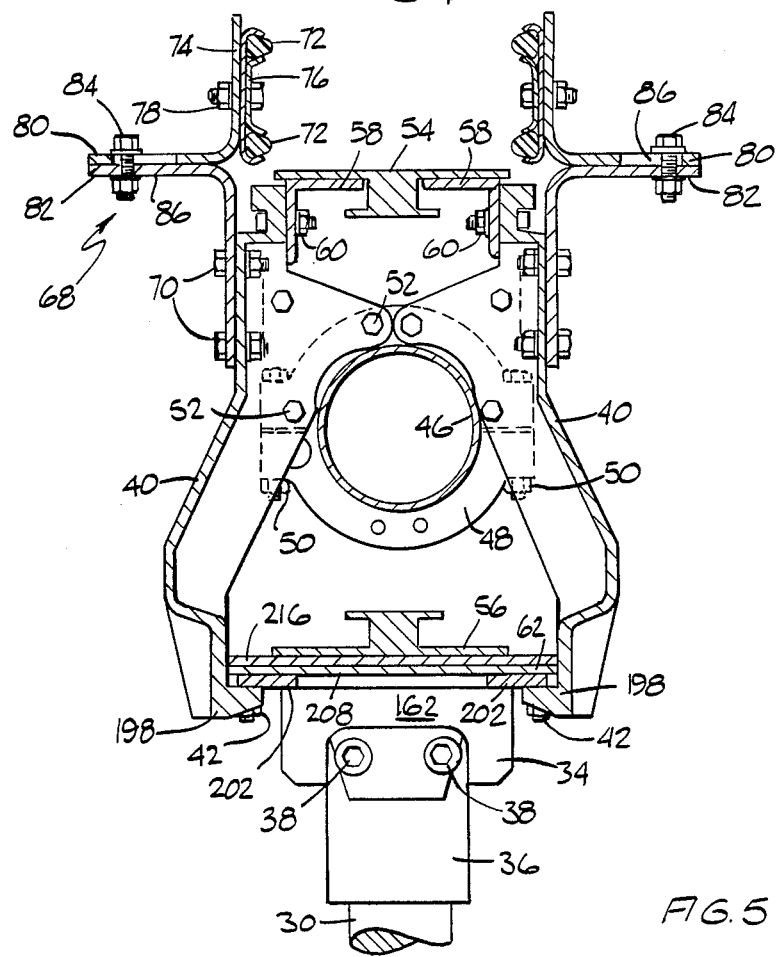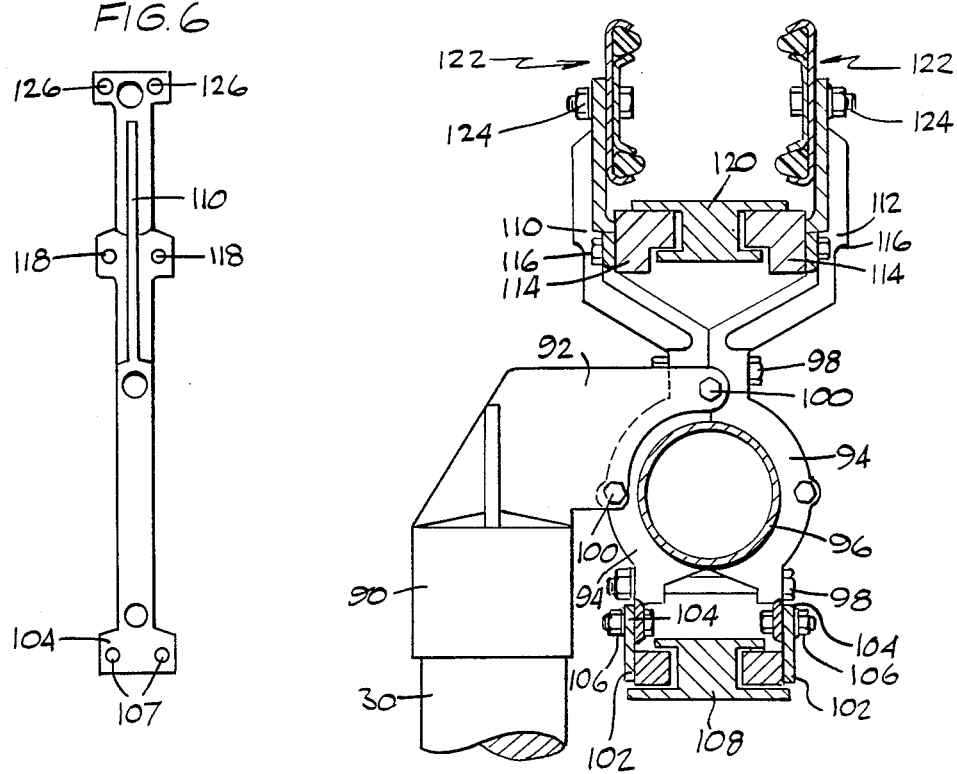

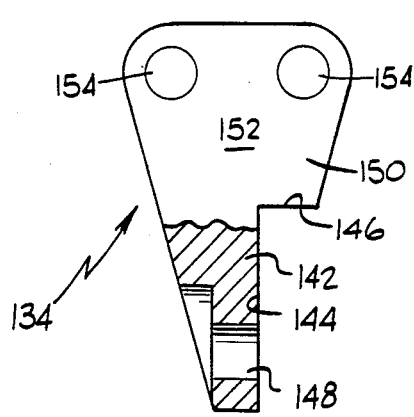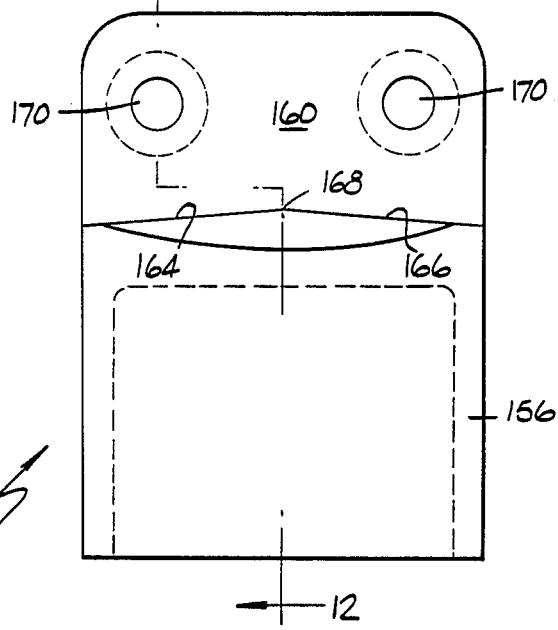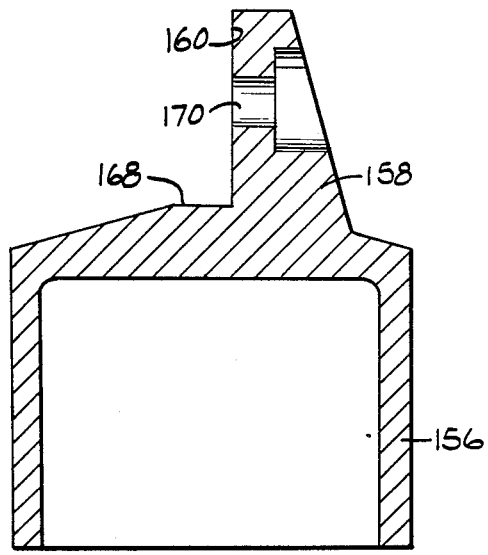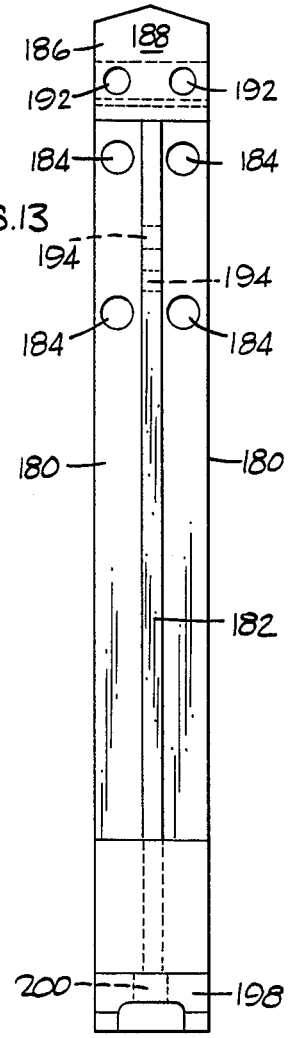

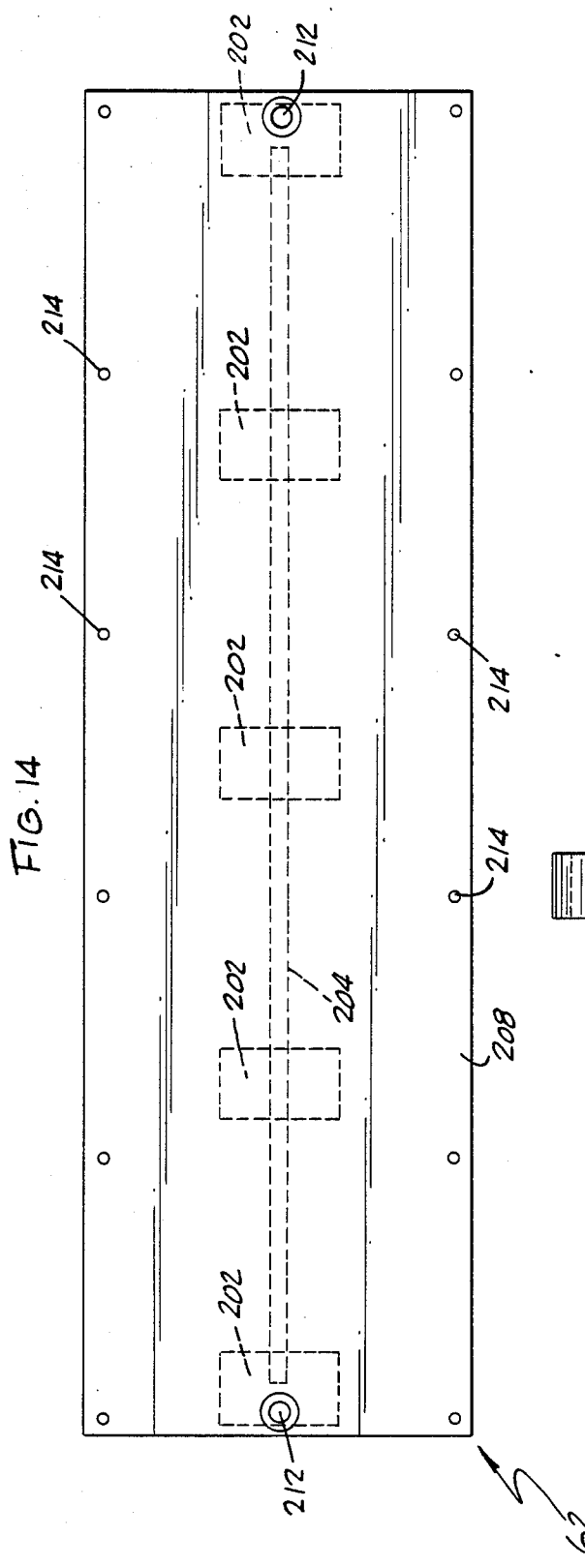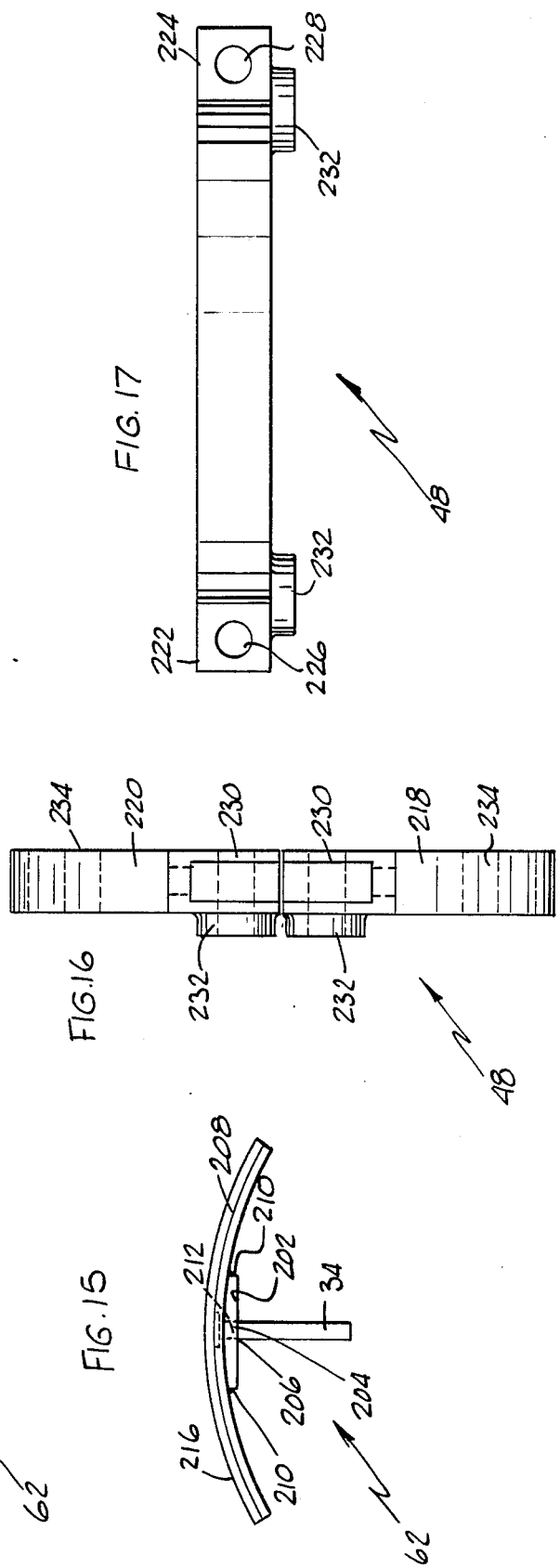

APPARATUS FOR SUPPORTING AN ARTICLE CONVEYING SYSTEM

FIELD OF THE INVENTION

This invention relates generally to article conveying systems, such as for cans and bottles, and more specifically to apparatus for supporting an article conveying system.

BACKGROUND OF THE INVENTION

There are many different conveying systems for use in conveying articles, such as cans and bottles, and many different kinds of apparatus for supporting such conveying systems. Each of the supporting apparatus differs to such an extent that it is necessary to design a new supporting apparatus each time a different conveyor system is desired. Therefore, there exists a need for apparatus for supporting conveying systems of any nature which apparatus comprises a plurality of standard parts which may be readily assembled using conventional means such as nuts and bolts. In addition to being readily assembled, the apparatus should also be capable of being readily disassembled so that it can be easily moved to a new location if such movement is desired.

BRIEF DESCRIPTION OF THE INVENTION

This invention provides apparatus for supporting an article conveying system such as a moving endless conveyor means for supporting articles to be moved from one location to another location which apparatus has a plurality of standard parts which may be readily assembled or disassembled and wherein the apparatus provides ready access to the conveying system for inspection and cleaning.

In the preferred embodiment of the invention, apparatus is provided for supporting a plurality of endless conveyor means, such as endless chain conveyors, each of which has top and bottom runs. The apparatus comprises a plurality of spaced apart base support members adapted to be mounted on a fixed support surface, such as a floor of a building; a plurality of primary plate support members, each of which is releasably secured to one of the base support members; a plurality of primary support members, each of which is releasably secured to each end of the primary plate support members so as to form opposite pairs of primary support members. Rigidifying means are releasably secured to the primary support members for providing rigidity to the apparatus and the rigidifying means have a length at least as great as the length of either of the top or bottom run and are located between the top run and the bottom run of the endless conveyor means. A plurality of intermediate support members are releasably secured to the rigidifying means and are located inbetween adjacent pairs of the primary support members. A plurality of intermediate plate support members are releasably secured to opposite pairs of the intermediate support members. Top run chain guide and support means extend between and are releasably secured to the primary support members at adjacent pairs of base support members for guiding and supporting the top run and bottom run chain guide and support means are releasably secured to at least the primary plate support means for guiding and supporting the bottom run. Guard rail means are releasably secured to and extend between at least the primary support members for ensuring that the articles remain on said top run and to transfer articles between adjacent top runs. In some instances, such as a single conveyor means, the primary support member is a special split clamping bracket that clamps onto a rigidifying means. The apparatus is designed for ready access to the conveying system for inspection and cleaning.

BRIEF DESCRIPTION OF THE DRAWINGS

An illustrative and presently preferred embodiment of the invention is shown in the accompanying drawings in which:

FIG. 3 is a top plan view of FIG. 2 with parts broken away and other parts removed;

FIG. 4 is a cross-sectional view taken on the line 4—4 of FIG. 1;

FIG. 5 is a view similar to FIG. 4 but illustrating another embodiment of the invention;

FIG. 6 is an elevational view of a support member of FIG. 5;

FIG. 10 is an elevational view with parts in section of a guide rail support;

FIG. 11 is an elevational view of the releasable securing means;

FIG. 12 is a cross-sectional view taken on the line 12—12 of FIG. 11;

FIG. 13 is an elevational view of a primary support member;

FIG. 14 is a top plan view of the bottom run guide and support means and the plate support member;

FIG. 15 is an end elevational view of FIG. 14;

FIG. 16 is a side elevational view of a clamping bracket;

FIG. 17 is a top plan view of FIG. 16; and

DETAILED DESCRIPTION OF THE INVENTION

Figure 1:
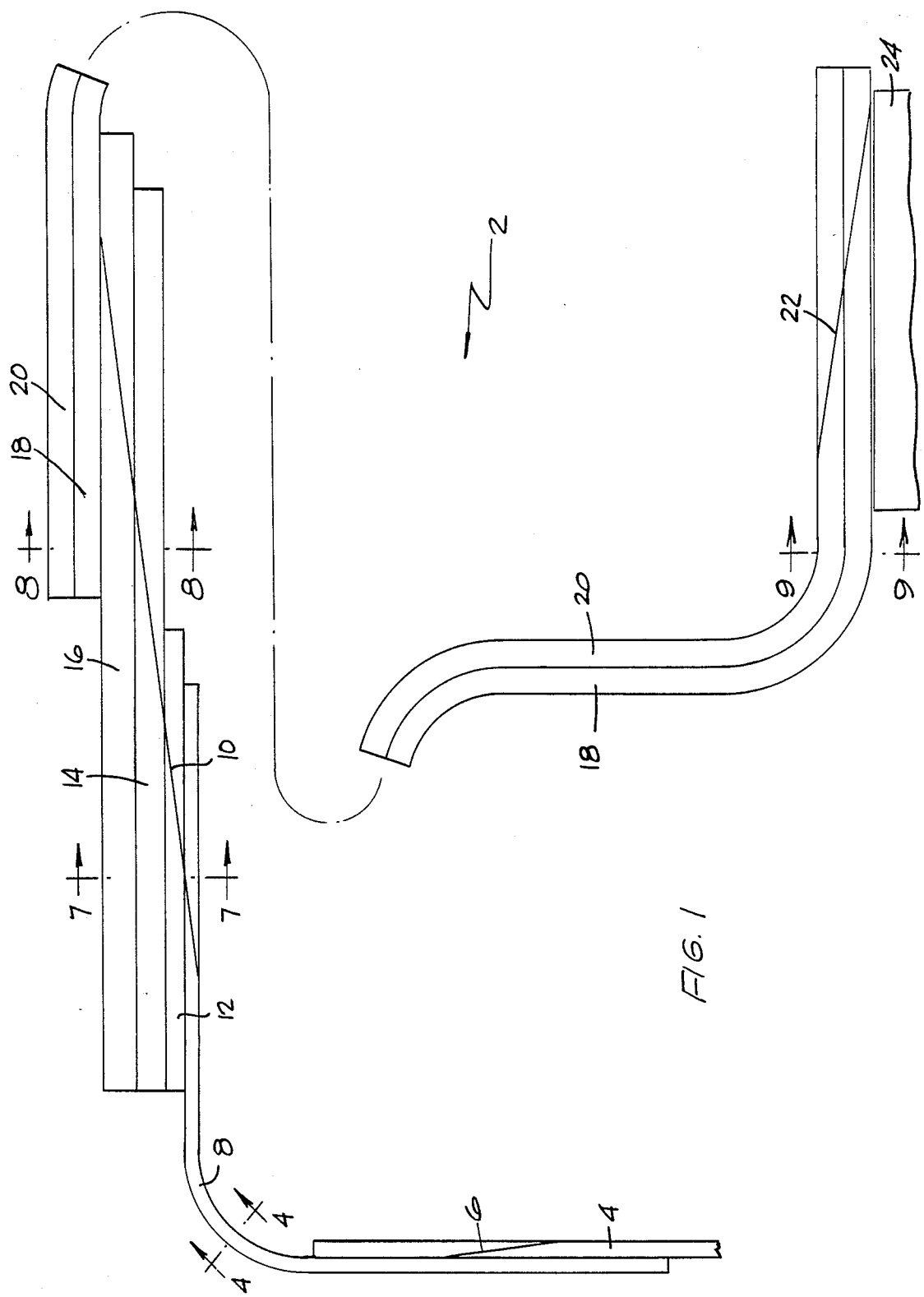
FIG. 1 is a schematic top plan illustration of a conveying system.

In FIG. 1, there is a schematic illustration of a conveying system 2 comprising a first endless conveyor means 4 for carrying cans or bottles (not shown) from a can or bottle filling and sealing process apparatus (not shown). A first guide means 6 transfers the cans or bottles to a second conveyor means 8. The first and second conveyor means 4 and 8 are moved at the same velocity such as about 275 feet per minute. A second guide means 10 transfers the cans or bottles successively onto third 12, fourth 14, fifth 16, sixth 18 and seventh 20 conveyor means which are each moving at slower velocities, such as respectively about 220; 165; 110; 70 and 70 feet per minute so that the velocities of the cans or bottles are gradually decreased. A third guide means 22 transfers the cans or bottles onto an eighth conveyor means 24 leading to a packaging or other processing operation (not shown). The conveyor means 4, 8, 12, 14, 16, 18 and 20 are generally endless conveyors of conventional structures, such as endless chains or mats.

Figure 2:
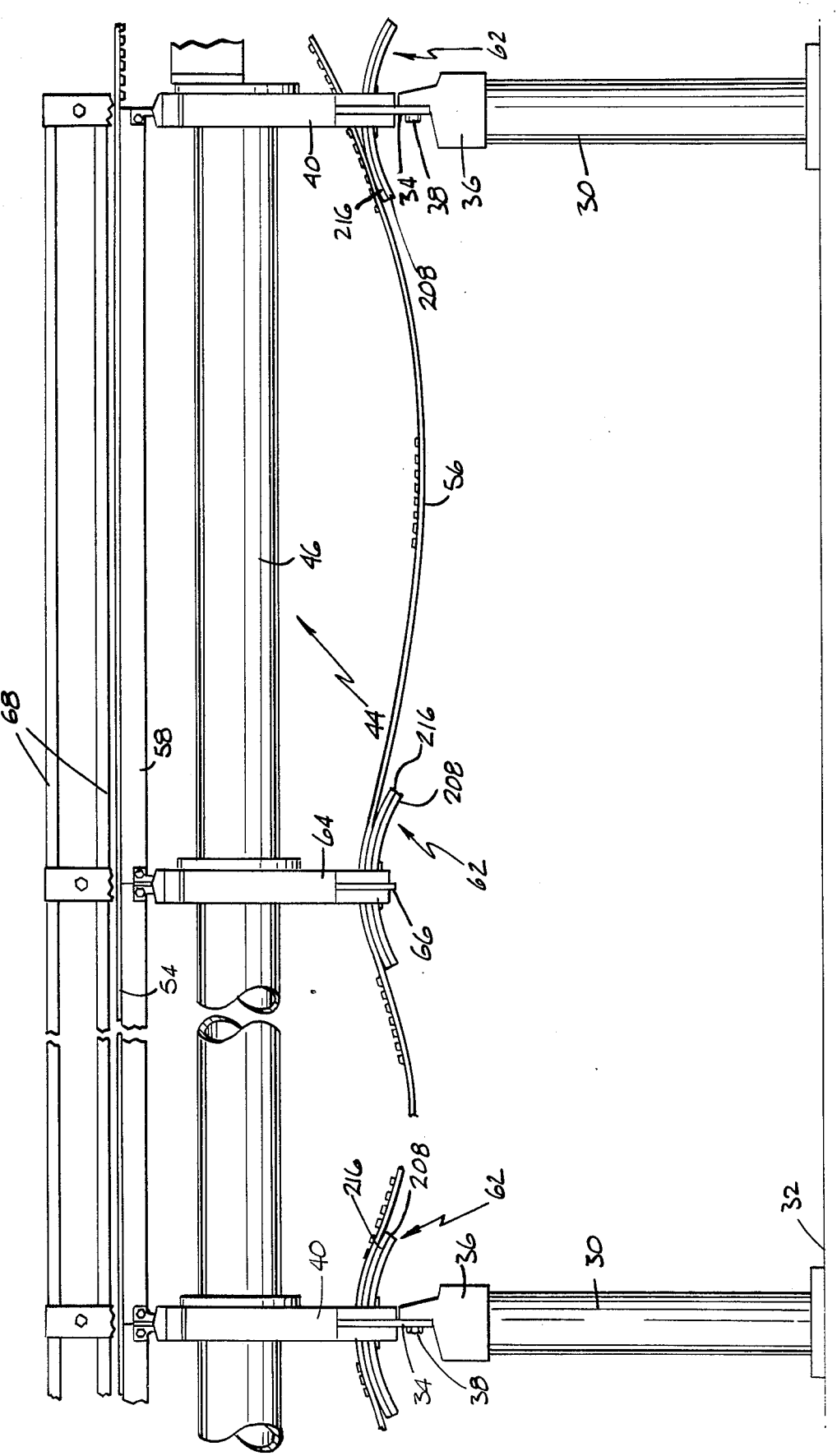
FIG. 2 is a side elevational view of a portion of the conveying system.
Figure 7:
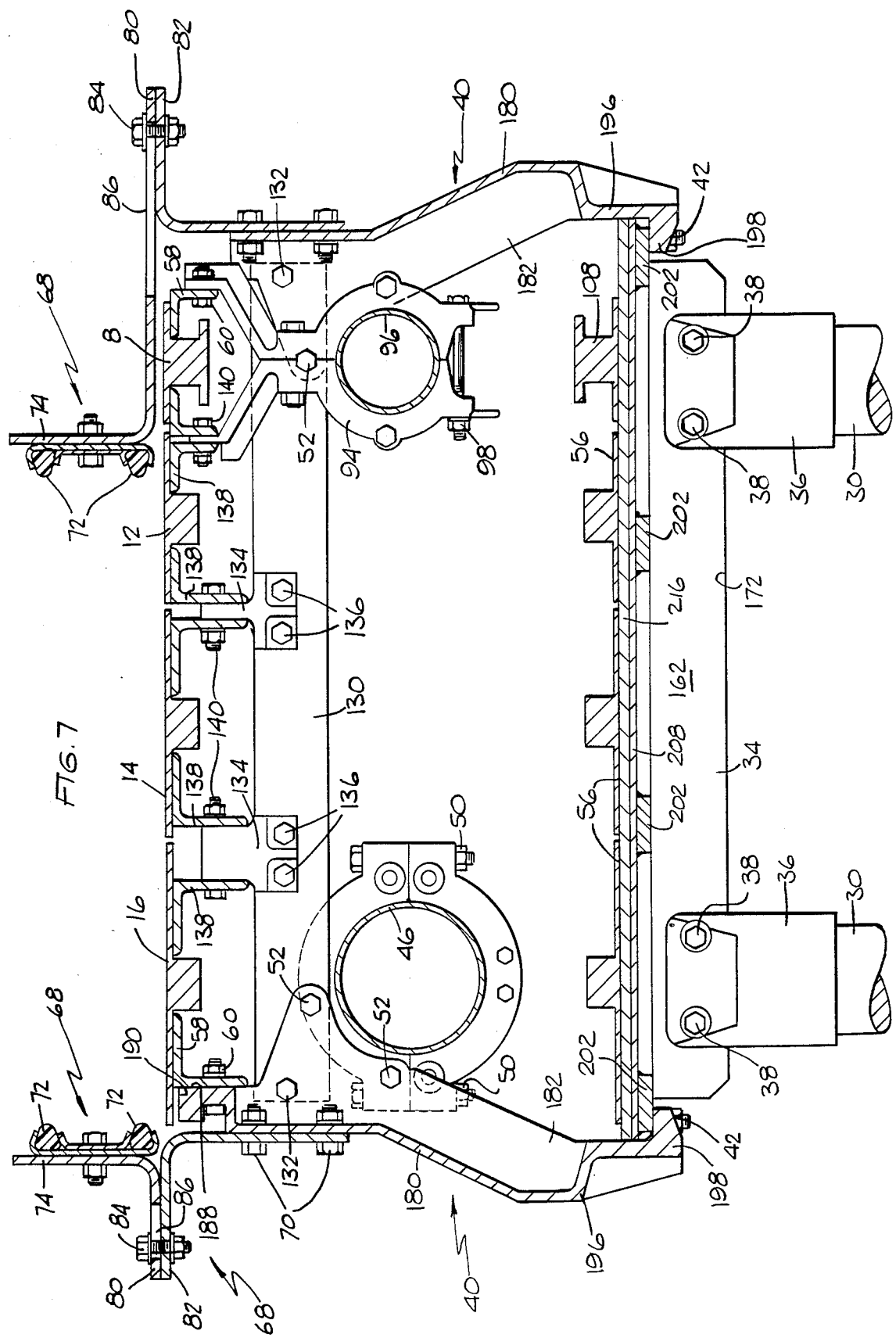
FIG. 7 is a cross-sectional view taken on the line 7—7 of FIG. 1.
Figure 8:
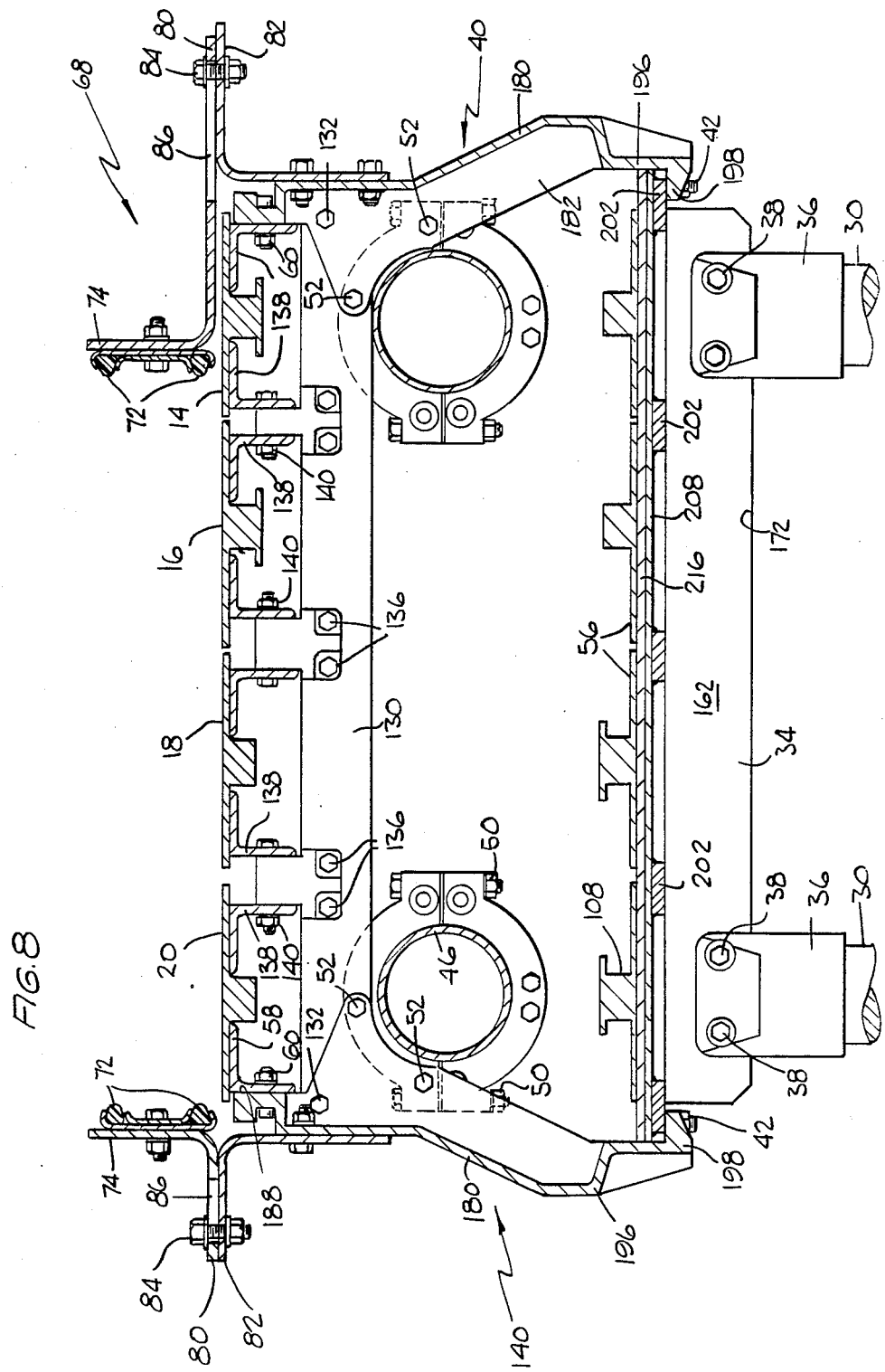
FIG. 8 is a cross-sectional view taken on the line 8—8 of FIG. 1.
Figure 9:
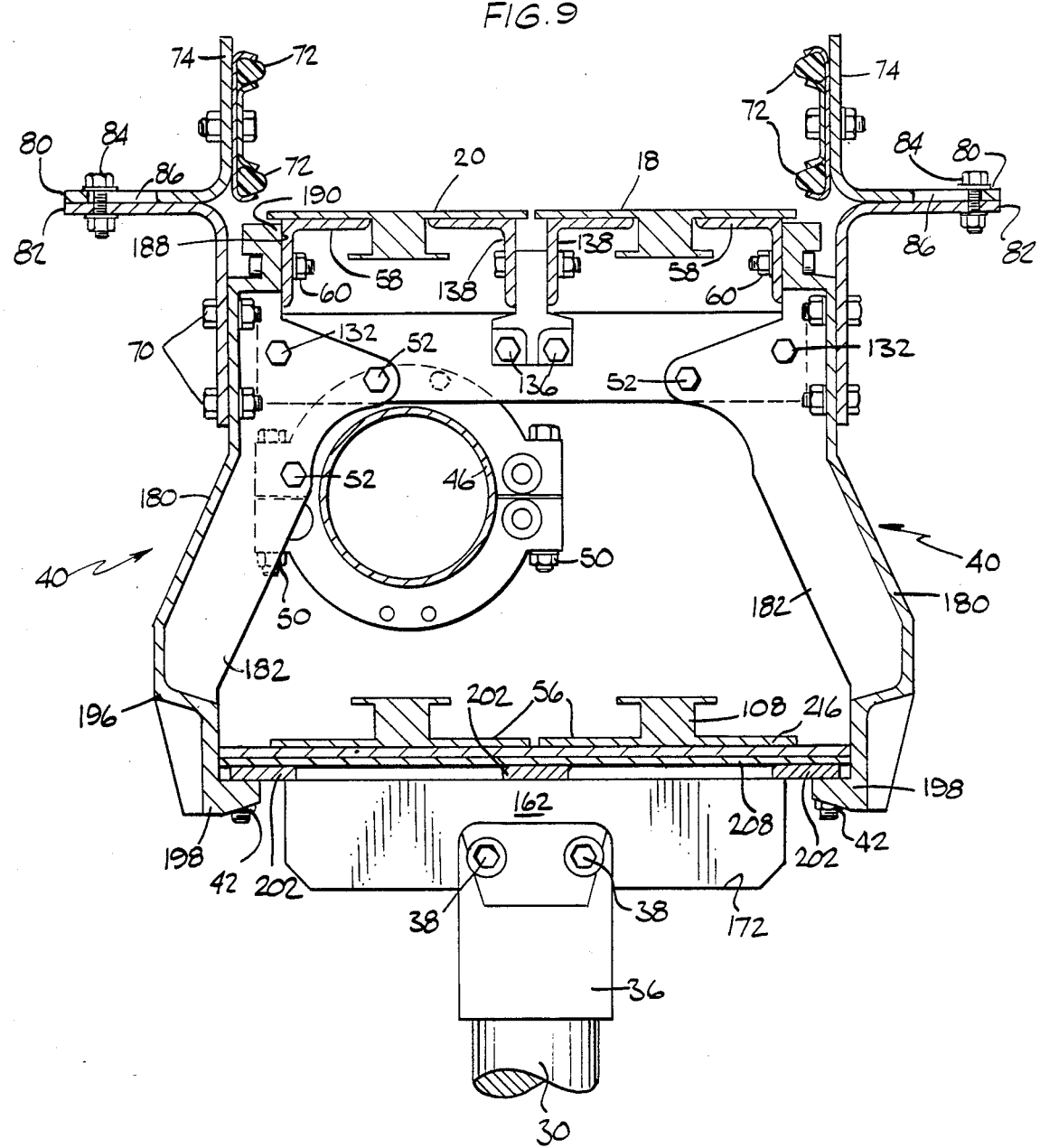
FIG. 9 is a cross-sectional view taken on the line 9—9 of FIG. 1.

The apparatus for supporting the conveying system 2 is illustrated in FIGS. 2–9 and comprises a plurality of spaced apart solid, cylindrical base support members 30 mounted on a fixed support surface 32, such as a floor of a building. The distance between the centerlines of adjacent base support members 30, as illustrated in FIG. 2, is about 6 feet. A plurality of primary plate support members 34 are releasably secured to the base support members 30 by connecting support means 36, described more fully below, which are secured on the base support members 30. The primary plate support members 34 are secured to connecting support means 36 by nuts and bolts 38. A plurality of primary support members 40 are releasably secured to the primary plate support members 34 by nuts and bolts 42 (FIG. 4) so as to form a cooperating pair of opposite primary support members 40. Rigidifying means 44, comprising an elongated cylindrical tube 46, having split clamping brackets 48 releasably secured thereon by nuts and bolts 50, are releasably secured to the primary support members 40 by nuts and bolts 52 passing through openings in the split clamping brackets 48 and the primary support members 40. The rigidifying means 44 provide rigidity for the apparatus and are located between the top run 54 and the bottom run 56 of the endless conveyor means. A plurality of top run guide and support means 58 extend between adjacent primary support members 40 as illustrated in FIG. 3. At least a portion of the top run guide and support means 58 is releasably secured to the primary support member 40 by nuts and bolts 60. The top run guide and support means 58 have a length that is slightly less than the distance between the centerlines of adjacent base support members 30. When there are a plurality of endless conveyor means, as illustrated in FIGS. 7–9, other portions of the top run guide and support means 58 are supported as described below. Bottom run guide and support means 62 are secured to each primary plate support member 34 by suitable means described below.

An intermediate support member 64 is releasably secured to a split clamping bracket 48 secured on each of the elongated tubes 46 by nuts and bolts as described above in relation to the primary support member 40 so as to form a cooperating pair of opposite intermediate support members. Also, an intermediate plate support member 66 extends between opposite intermediate support members 64 and is releasably secured thereto by nuts and bolts as described above in relation to the primary plate support members 40. Bottom run guide and support means 62 are secured to the intermediate plate support member 66 as described below. The intermediate support members 64 are located half-way between adjacent base support members 30. The intermediate support members 64 have the same structure as the primary support members 40.

Guard rail means 68 (FIG. 4) are releasably secured to the primary support members 40 and the intermediate support members 64 by nuts and bolts 70. The guard rail means 68 comprise a pair of spaced apart guide rails 72 in parallel relationship secured to an upstanding flange portion 74 by a plate member 76 and nuts and bolts 78. The guard rail means 68 are located on either side of a single conveyor means or a plurality of conveyor means to ensure that the cans or bottles remain on the conveyor means and also to function to guide the cans or bottles from one conveyor means to a next adjacent conveyor means. The guard rail means for these purposes are illustrated on the left and right sides of FIG. 7.

The upstanding flange portion 74 has a base member 80 which is slidably and pivotally mounted on a support flange 82 by nut and bolt 84 passing through an elongated slot 86. As illustrated by the left and right sides of FIG. 7, the length of the base member 80 and the slot 86 depends on whether the guard rail means 68 is functioning only beside the top run 54 as illustrated on the left side or whether it is functioning as a guide means to transfer cans or bottles from one conveyor means to the next adjacent conveyor means as illustrated on the right hand side.

Where there is only one conveyor means, such as in FIGS. 4 and 5, the construction of the apparatus as illustrated in FIGS. 5 and 6, is preferred. A base support member 30 is mounted on the fixed support surface 32 (not shown in FIG. 5) and a connecting means 90 is secured to the base support member 30 and has an outwardly projecting flange portion 92. A split clamping bracket 94 is secured on the elongated cylindrical tube 96 by nuts and bolts 98. The split clamping bracket 94 is secured to the flange portion 92 by nuts and bolts 100. Bottom run guide and support means 102 are releasably secured to downwardly projecting portions 104 of the split clamping bracket 94 by nuts and bolts 106 passing through openings 107 for guiding and supporting the bottom run 108 of the conveyor means. The split clamping bracket 94 has a pair of spaced apart opposite upwardly projecting portions 110 and 112. Top run guide and support means 114 are releasably secured to the upwardly projecting portions 110 and 112 by nuts and bolts 116 passing through openings 118 for guiding and supporting the top run 54 of the conveyor means. Guard rail means 122, similar to guard rail means 68, are releasably secured to the upwardly projecting portions 110 and 112 in a similar manner by nuts and bolts 124 passing through openings 126.

FIG. 7 illustrates the apparatus for supporting the four adjacent conveyor means 8, 12, 14 and 16. The structures in FIG. 7 which are similar to the structures described above have been given the same reference numerals. An additional support member 130 extends between and is adjustably secured to opposite primary support members 40 by the nuts and bolts 52 and the nuts and bolts 132. A plurality of support brackets 134 are releasably secured to the additional support member 130 by nuts and bolts 136. Other portions 138 cooperating with the top run guide and support means 58 for supporting the endless conveyor means 8, 10, 12 and 14 are releasably secured to the support brackets 134 by nuts and bolts 140. As illustrated, two base support members 30 are used at this location. Guard rail means 68 above the conveyor means 8 and 12 is running on a diagonal as illustrated in FIG. 1 and function as a portion of the second guide means 10.

FIG. 8 illustrates the apparatus for supporting the four adjacent conveyors 14, 16, 18 and 20. The structures in FIG. 8 which are similar to structures described above have been given the same reference numerals. Guard rail means 68 above the conveyor means 14 is running on a diagonal as illustrated in FIG. 1 and functions as another portion of the second guide means 10.

FIG. 9 illustrates the apparatus for supporting the two adjacent conveyors 18 and 20. The structures in FIG. 9 which are similar to the structures described above have been given the same reference numerals.

A support bracket 134 is illustrated in FIG. 10 and comprises a bottom portion 142 having a recess defined by intersecting, generally planar surfaces 144 and 146 which are placed in contact with the additional support member 130 and releasably secured thereto by nuts and bolts 136 passing through the openings 148. The top portion 150 has two opposite, generally planar surfaces 152 which lie in planes substantially perpendicular to the plane of the generally planar surface 144. The top portion 150 has two openings 154 through which the nuts and bolts 140 pass to secure adjacent end portions of the top run guide and support means 138 which end portions have openings therein to accommodate the nuts and bolts 140. The top run guide and support means 58 and 138 have a length slightly less than the distance between the centerlines of adjacent base support members 30, which distance is about 6 feet.

The connecting support means 36 are illustrated in FIGS. 11 and 12 and comprise a hollow cylindrical portion 156 having an inner diameter slightly greater than the outer diameter of a base support member 30 so as to have a sliding fit thereon. The top portion 158 has a generally planar surface 160 which is adapted to fit against a generally planar surface 162 (FIG. 4) of a primary plate support member 34. The top portion 158 has two generally planar surfaces 164 and 166 which project outwardly from the generally planar surface 160 and which are inclined relative to each other to form an apex portion 168. The top portion 158 also has openings 170 to cooperate with the nuts and bolts 38 for releasably securing the primary plate support member 34 thereto. During assembly of the apparatus, the sliding fit of the bottom portion 156 on a base support member 30 allows for the adjustment of the primary plate support member 34 at the desired distance above the fixed support surface 32 so as to level the top run 54 of the conveyor means. Also, the bottom surface 172 of the primary plate support member 34 is supported on the apex portion 168. The openings 170 are made slightly larger than the bolts of the nuts and bolts 38 so as to allow for some pivotal movement of the primary plate support member 34 for leveling purposes. After leveling, the bottom portion is tack welded to the base support member 30.

The primary support member 40 is illustrated in FIG. 13 and comprises a base member 180 and a central flange portion 182 projecting outwardly therefrom. The base member 180 has a plurality of openings 184 to accommodate the nuts and bolts 70 used to secure the guard rail means 68 thereto. The base member 180 has a top portion 186 having a generally planar surface 188 for abutting engagement with a generally planar surface 190 of the top run guide and support means 58. The top portion 186 has openings 192 therein to accommodate the nuts and bolts 60 for releasably securing adjacent end portions of the top run guide and support means 58 thereto. The flange portion 182 has openings 194 therein to accommodate the nuts and bolts 52 and 132 for securing the split clamping bracket 48 and the additional support member 130 thereto. The bottom portion 196 is shaped so as to provide a ledge portion 198 (FIG. 4) which faces the ledge portion 198 of an opposite primary support member 40. The ledge portion 198 has an opening 200 extending therethrough to accommodate the nuts and bolts 42 used to releasably secure the primary support member 40 to the primary plate support member 34.

The bottom run guide and support means 62 is illustrated in FIGS. 14 and 15 and comprise a plurality of support plates 202 secured to the upper surface 204 of the primary plate support member 34 by suitable means such as by welding 206. An arcuately shaped plate member 208 is secured to the support plates 202 by suitable means such as welding 210. The arcuately shaped plate member 208 and the end support plates 202 have an opening 212 extending therethrough to accommodate the nuts and bolts 42 for releasably securing the primary support member 40 thereto. The arcuately shaped plate member 208 is provided with a plurality of openings 21 for securing an arcuately shaped plastic wear cover 216 thereto by nuts and bolts (not shown).

The split clamping bracket 48 is illustrated in FIGS. 16 and 17 and comprises two sections 218 and 220 each of which have flange portions 222 and 224 having openings 226 and 228 to accommodate the nuts and bolts 50 for clamping the split clamping bracket 48 onto the tube 46. The sections 218 and 220 are provided with openings 230 having flanged entrance portions 232 to accommodate the nuts and bolts 52 used for releasably securing the split clamping bracket 48 to the primary support member 40. The sections 218 and 220 are also provided with openings 234 to accommodate the nuts and bolts 52 used for releasably securing th primary support member 40, the additional support member 130 and the split clamping bracket 48 together.

As described above, applicant has provided apparatus for use in supporting various numbers of conveyor means that may be readily assembled using many interchangeable parts. Also, the location of the rigidifying means between the top and bottom runs is a significant advantage. In addition to being readily assembled, the apparatus may also be readily disassembled if it is desired to move the apparatus to a new location. As illustrated in the drawings, the apparatus is substantially completely open so that all portions thereof are readily available for inspection and/or cleaning.

Figure 18:
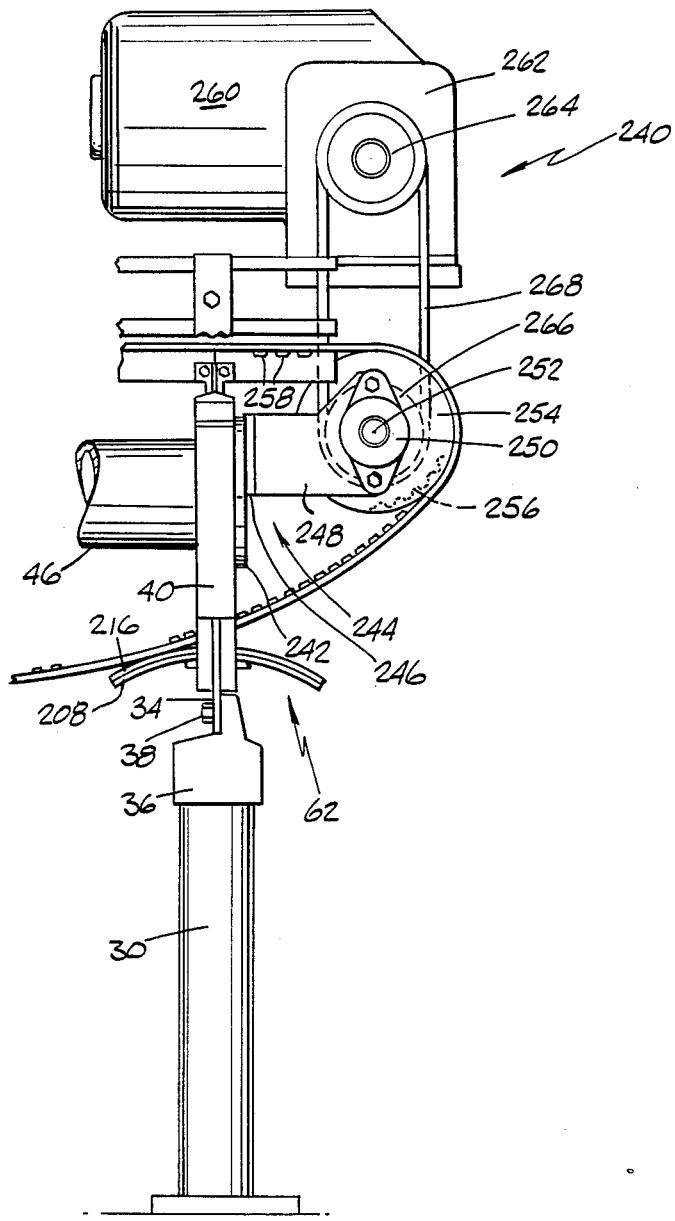
FIG. 18 is a side elevational view of a drive means for an endless conveyor.

In FIG. 18, there is illustrated a driving means 240 for moving at least one of the above-described endless conveyors. A support block 242 is mounted on the elongated cylindrical tube 46. Supporting structure 244 is secured to the support block 242 and comprises an elongated support plate 246 having outwardly projecting flange portions 248 at each end thereof. A bearing 250 is mounted on each of the
n flange portions 248. An elongated rotatable shaft 252 is mounted in the bearing 250 and has a driving sprocket 254 secured thereto for rotation therewith and having teeth 256 to mesh with the lugs 258 to drive an endless conveyor belt. A drive motor 260 is fixedly mounted by conventional supporting structure (not shown) and has a speed control device 262 operationally associated therewith and which functions to rotate a driving pulley 264. A driven pulley 266 is secured to the elongated rotatable shaft 252. A drive belt 268 is journaled around the driving pulley 264 and the driven pulley 266 so that rotation of the driving pulley 264 rotates the driven pulley 266 and therefore the elongated rotatable shaft 252 and the driving sprocket 254 so as to move the endless belt.

While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. Apparatus for supporting an article conveying system comprising:

at least one endless conveyor means for supporting and moving a plurality of articles and having a top run and a bottom run;

a plurality of spaced apart base support members adapted to be mounted on a fixed support surface;

a plurality of separate primary plate support members, each of which is releasably secured to one of said base support members;

a plurality of cooperating pairs of opposite separate primary support members, each primary support member being releasably secured to the same one of said primary plate support members so that said top and bottom runs are located therebetween;

rigidifying means for providing rigidity to said apparatus;

at least one primary support member of each pair of said cooperating pairs of primary support members being releasably secured to said rigidifying means;

said rigidifying means have a length at least as great as the length of either of said top or bottom runs;

said rigidifying means being located between and spaced from said top run and said primary plate support members;

separate top run chain guide and support means extending between and releasably secured to adjacent cooperating pairs of opposite primary support members for guiding and supporting said top run; and separate bottom run chain guide and support means for guiding and supporting said bottom run.

2. Apparatus as in claim 1 and further comprising:

at least a pair of opposite intermediate support members releasably secured to said rigidifying means and located in between adjacent pair of opposite primary support members;

an intermediate plate support member releasably secured to said pair of opposite intermediate support members; and bottom run chain guide and support means releasably secured said intermediate plate support members for guiding and supporting said bottom run.

3. Apparatus as in claim 1 and further comprising:

guard rail means on each side of said top run and releasably secured to at least said primary support members for ensuring that said articles remain on said top run.

4. Apparatus as in claim 1 wherein said rigidifying means comprises:

an elongated tube.

5. Apparatus as in claim 1 and further comprising:

releasable securing means for releasably securing each of said primary plate support members to each of said base support members;

said releasable securing means being slidably mounted on said base support member for initial adjustment of said primary plate support member toward or away from said fixed support surface; and pivot means on said releasable securing means for permitting pivotal movement of said primary support plate about an axis extending parallel to said rigidifying means.

6. Apparatus as in claim 1 wherein said at least one endless conveyor means comprises:

a plurality of endless conveyor means for supporting and moving a plurality of articles, each having a top run and a bottom run.

7. Apparatus as in claim 6 wherein said rigidifying means comprises:

at least a pair of spaced apart elongated tubes in parallel relationship; and one of said cooperating pair of opposite separate primary support members being releasably secured to one of said elongated tubes and the other one of said cooperating pair of opposite separate primary support members being releasably secured to the other one of said elongated tubes.

8. Apparatus as in claim 7 wherein:

said pair of spaced apart elongated tubes are each cylindrical.

9. Apparatus as in claim 6 and further comprising:

a plurality of separate additional support members, each of which extends between and is secured to each primary support member of said pair of opposite primary support members;

top run guide and support means for each of said plurality of endless conveyor means for guiding and supporting said top run;

at least one support bracket releasably secured to each of said additional support members; and at least portions of said top run guide and support means being releasably secured to said at least one support bracket.

10. Apparatus as in claim 9 wherein said rigidifying means comprises:

at least a pair of spaced apart elongated tubes in parallel relationship; and wherein said at least one support bracket comprises a plurality of support brackets, each of which is releasably secured to said additional support member and each of which has a portion of said top run guide and support means releasably secured thereto.

11. Apparatus as in claim 10 and further comprising:

a plurality of clamping brackets, each of which is releasably secured to one of said elongated tubes; and each of said plurality of clamping brackets being releasably secured to one of said primary support members.

12. Apparatus as in claim 11 and further comprising:

guard rail means releasably secured to at least said primary support members for ensuring that said articles remain on said plurality of endless conveyor means and to guide the movement of said articles from one of said plurality of endless conveyor means to another of said plurality of endless conveyor means.

13. Apparatus as in claim 11 wherein:

said primary support members are substantially identical in structure so that each of said primary support members can be releasably secured to either one of said opposite end portions of said primary plate support member.

14. Apparatus as in claim 11 and further comprising:

a plurality of spaced apart base support members releasably secured to each of said primary plate support members.

15. Apparatus as in claim 11 wherein:

each of said additional support members comprises an elongated generally flat bar having a length, a width and a thickness;

each of said support brackets having at least two generally planar surfaces lying in perpendicular planes; and one of said planar surfaces being in contact with one of said additional support members and the other of said planar surfaces being in contact with said at least portions of said top run and guide support means.

16. Apparatus as in claim 15 and further comprising:
releasable securing means for releasably securing each of said primary plate support members to each of said base support members;
said releasable securing means being slidably mounted on said base support member for initial adjustment of said primary plate support member toward or away from said fixed support surface; and
pivot means on said releasable securing means for permitting pivotal movement of said primary support plate about an axis extending parallel to said pair of elongated tubes.

17. Apparatus for supporting an article conveying system comprising:
at least one endless conveyor means for supporting and moving a plurality of articles and having a top run and a bottom run;
a plurality of spaced apart base support members adapted to be mounted on a fixed support surface;
a primary support member releasably secured to each of said base support members;
rigidifying means for providing rigidity to said apparatus;
said rigidifying means having a length at least as great as the length of either of said top run or said bottom run;
said rigidifying means being located between said top run and said bottom run;
a split clamping bracket clamped onto said rigidifying means;
releasable securing means for securing together said primary support member and said split clamping bracket;
a pair of spaced apart upwardly projecting portions on said split clamping bracket;
top run guide and support means releasably secured to said upwardly projecting portions for guiding and supporting said top run; and
a pair of spaced apart downwardly projecting portions on said split clamping bracket; and
bottom run guide and support means releasably secured to said downwardly projecting portions for guiding and supporting said bottom run.

18. Apparatus as in claim 17 and further comprising:
guard rail means on each side of said top run and releasably secured to said upwardly extending portions for ensuring that said articles remain on said top run.

* * * * *